US008670714B2

(12) United States Patent
Marcovecchio et al.

(10) Patent No.: US 8,670,714 B2
(45) Date of Patent: Mar. 11, 2014

(54) MOBILE WIRELESS COMMUNICATIONS DEVICE HAVING A NEAR FIELD COMMUNICATION (NFC) DEVICE AND PROVIDING MEMORY ERASURE AND RELATED METHODS

(75) Inventors: Vincenzo Kazimierz Marcovecchio, Ottawa (CA); Ravi Singh, Toronto (CA); Marie Anita Brigitte Gagne, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 179 days.

(21) Appl. No.: 13/418,760

(22) Filed: Mar. 13, 2012

(65) Prior Publication Data

US 2012/0238207 A1   Sep. 20, 2012

Related U.S. Application Data

(60) Provisional application No. 61/452,511, filed on Mar. 14, 2011.

(51) Int. Cl.
*H04B 7/00* (2006.01)

(52) U.S. Cl.
USPC ............................ 455/41.2; 455/410; 455/418

(58) Field of Classification Search
USPC ........ 455/41.2, 410, 411, 418, 419; 340/5.28, 340/2.31
See application file for complete search history.

(56) References Cited

U.S. PATENT DOCUMENTS

| 5,978,668 | A * | 11/1999 | Maeda et al. ................. 455/410 |
| 6,480,096 | B1 * | 11/2002 | Gutman et al. .............. 340/5.31 |
| 6,510,501 | B1 * | 1/2003 | Ho ................................. 711/163 |
| 7,699,233 | B2 | 4/2010 | Pesonen |
| 8,356,361 | B2 * | 1/2013 | Werner et al. ................... 726/34 |
| 2004/0025031 | A1 * | 2/2004 | Ooi et al. ....................... 713/186 |

(Continued)

FOREIGN PATENT DOCUMENTS

| EP | 1501330 | 1/2005 |
| WO | 2007112787 | 10/2007 |

(Continued)

OTHER PUBLICATIONS

"StoLPaN—NFC mobile services standards consortium" www.stolpan.com.

(Continued)

*Primary Examiner* — Lewis West
*Assistant Examiner* — Raj Chakraborty
(74) *Attorney, Agent, or Firm* — Allen, Dyer, Doppelt, Milbrath & Gilchrist, P.A.

(57) ABSTRACT

A mobile wireless communications device may include a wireless transceiver, a processor coupled with the wireless transceiver, and a near-field communication (NFC) device coupled with the processor. The NFC device may include an NFC controller, an NFC transceiver coupled with the NFC controller, and a first memory coupled with the NFC controller. The first memory may be configured to store at least one first application. The mobile wireless communications device may also include a second memory coupled to the processor and configured to store at least one second application. The processor may be configured to disable the NFC transceiver based upon a security condition, disable access to the at least one first application, erase the at least one second application, perform reset operation, and erase the at least one application from the first memory after the reset operation.

25 Claims, 5 Drawing Sheets

(56) References Cited

U.S. PATENT DOCUMENTS

| | | |
|---|---|---|
| 2007/0200662 A1* | 8/2007 | Libin ........................... 340/5.28 |
| 2010/0082445 A1 | 4/2010 | Hodge et al. |
| 2010/0082490 A1 | 4/2010 | Rosenblatt et al. |
| 2010/0145854 A1* | 6/2010 | Messerges et al. ............. 705/44 |
| 2010/0306531 A1 | 12/2010 | Nahari et al. |
| 2010/0306819 A1 | 12/2010 | Nahari et al. |
| 2013/0145429 A1* | 6/2013 | Mendel et al. .................... 726/4 |

FOREIGN PATENT DOCUMENTS

| | | |
|---|---|---|
| WO | 2008144943 | 4/2008 |
| WO | 2008069829 | 6/2008 |
| WO | 2009018255 | 2/2009 |
| WO | 2009019255 | 2/2009 |
| WO | 2009105115 | 8/2009 |
| WO | 2010132559 | 11/2010 |

OTHER PUBLICATIONS

"GlobalPlatform Mobile Task Force Requirements for NFC Mobile: Management of Multiple Secure Elements" version 1.0 Public release Feb. 2010; Document Reference: GP_REQ_004.

"About Near Field Communication (NFC)" Nokia Pres Backgrounder Jun. 2006.

* cited by examiner

MOBILE WIRELESS COMMUNICATIONS DEVICE HAVING A NEAR FIELD COMMUNICATION (NFC) DEVICE AND PROVIDING MEMORY ERASURE AND RELATED METHODS

TECHNICAL FIELD

This application relates to the field of communications, and more particularly, to wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
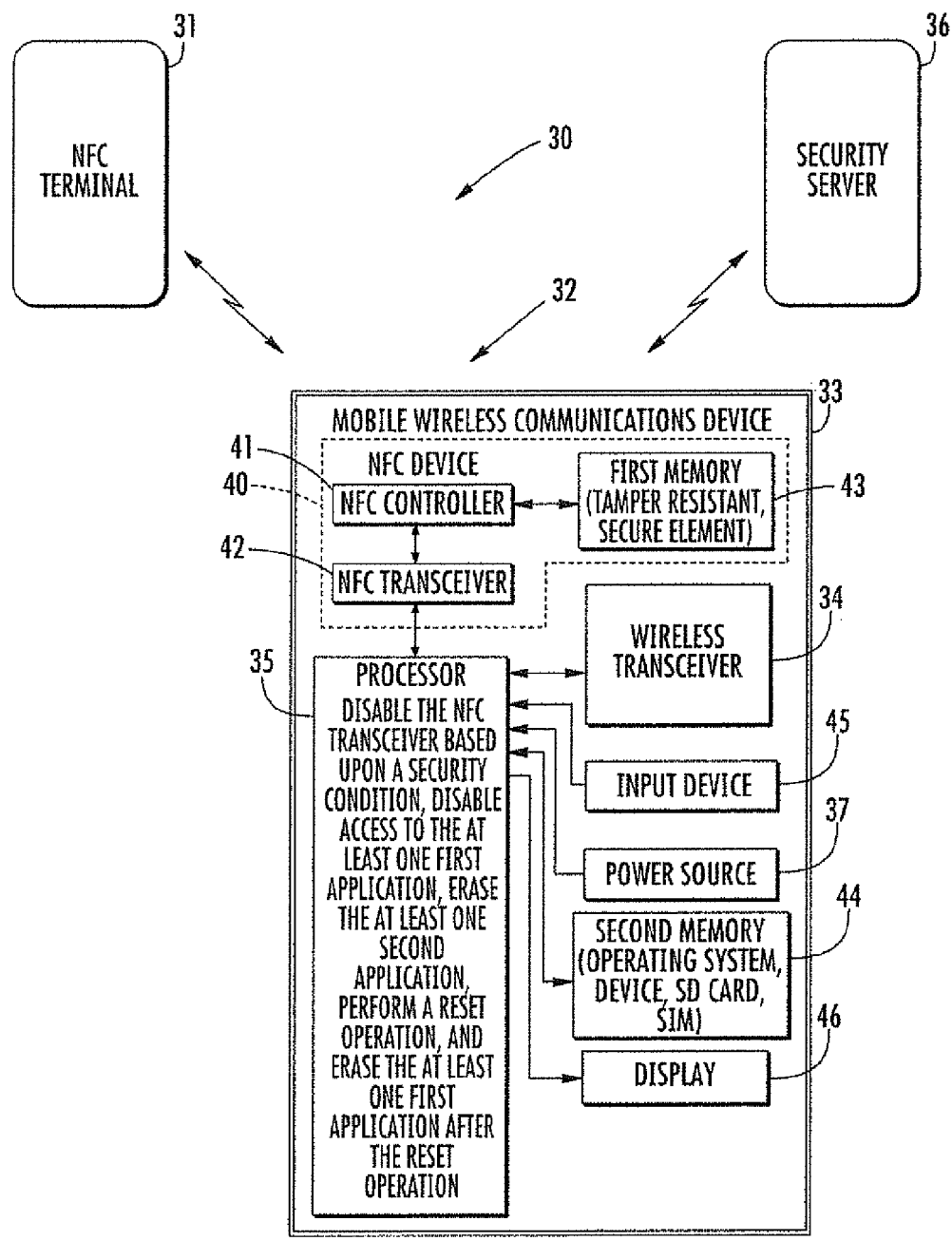
FIG. 1 is a schematic block diagram of a communications system in accordance with an example embodiment.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is disclosed herein which may include a wireless transceiver, a processor coupled with the wireless transceiver, and a near-field communication (NFC) device coupled with the processor, for example. The NFC device may include an NFC controller, an NFC transceiver coupled with the NFC controller, and a first memory coupled with the NFC controller. The first memory may be configured to store at least one first application, for example. The mobile wireless communications device may also include a second memory coupled to the processor and configured to store at least one second application. The processor may be configured to disable the NFC transceiver based upon a security condition, disable access to the at least one first application, erase the at least one second application, perform a reset operation, and erase the at least one application from the first memory after the reset operation, for example.

The processor may be configured to perform the reset operation after the erase of the at least one application of the second memory, for example. The first memory may include a secure element, for example.

The processor may be further configured to enable access to the NFC transceiver after the at least one first application is erased from the first memory. The processor may be further configured to erase the at least one first application after the reset operation is performed, based upon communication via the wireless transceiver, for example.

The mobile wireless communications device may include an input device coupled to the controller. The security condition may include a threshold number of unsuccessful access attempts via the input device. The security condition may include a security command entered via the input device, for example. The security condition may also include a security command received via the wireless transceiver.

The mobile wireless communications device may further include a power source coupled to the processor. The processor may be configured to perform the reset operation by at least selectively disabling the power source.

A related communications system and a method are also provided. The method aspect is directed to a communications method for a mobile wireless communications device that may include wireless transceiver circuitry, a processor coupled with the wireless transceiver circuitry, and a near-field communication (NFC) device coupled with the processor. The NFC device may include a NFC controller, an NFC transceiver coupled with the NFC controller, and a first memory coupled with the NFC controller and configured to store a first plurality of applications. The mobile wireless communications device may also include a second memory configured to store a second plurality of applications, for example. The method may include using the processor to disable the NFC transceiver based upon a security condition, using the processor to disable access to the first plurality of applications, and using the processor to erase the second application, for example. The method may also include using the processor to perform a reset operation, and using the processor to erase the first plurality of applications from the first memory after the reset operation.

A related computer-readable medium aspect is directed to a non-transitory computer-readable medium for use with a mobile wireless communications device, such as the one described briefly above. The non-transitory computer-readable medium may have computer-executable instructions for causing the mobile wireless communications device to perform various steps. The steps may include disabling the NFC transceiver based upon a security condition, disabling access to the first plurality of applications, and erasing the second application. The steps may further include performing a reset operation, and erasing the first plurality of applications from the first memory after the reset operation.

Figure 2:
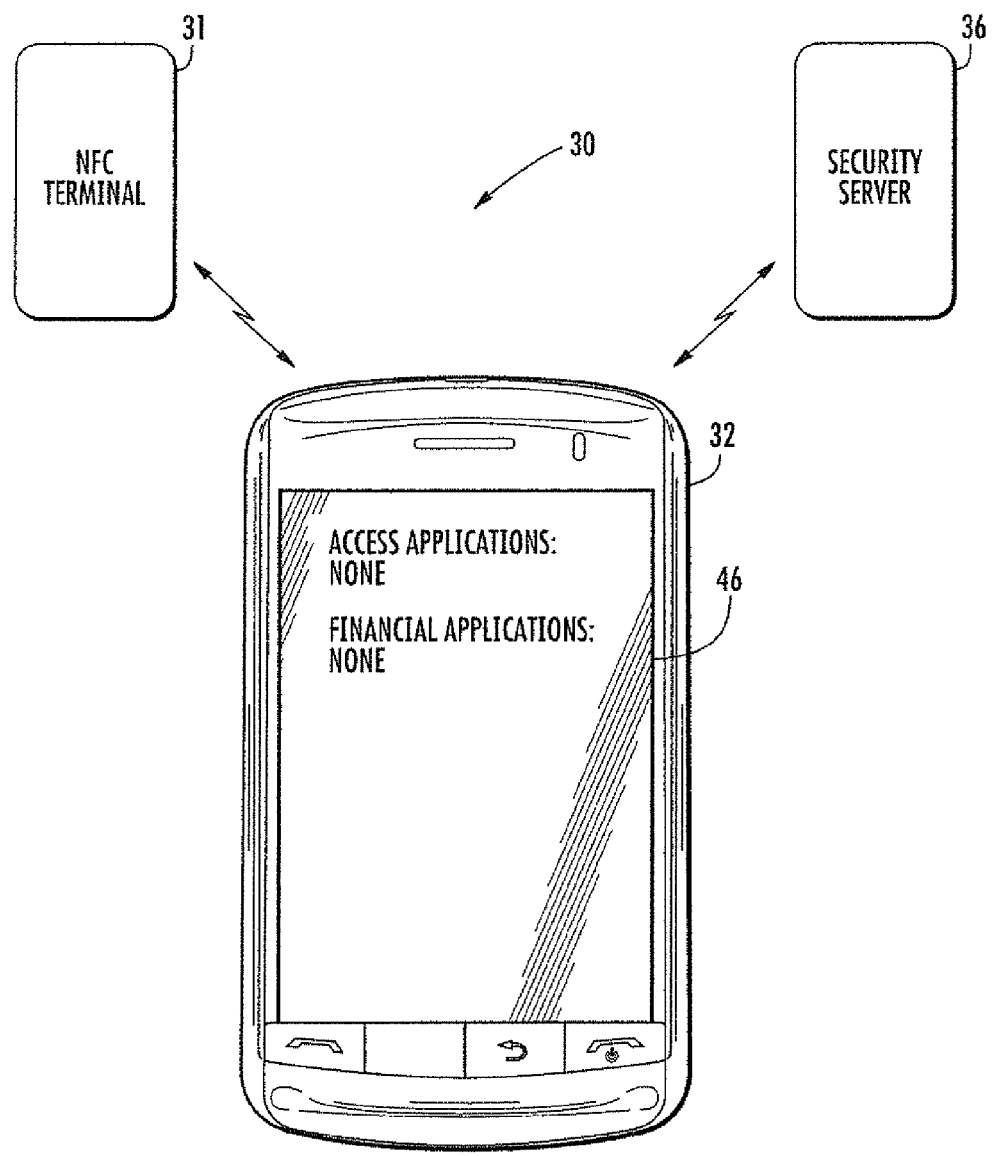
FIG. 2 is a schematic diagram of the communications system of FIG. 1 showing the display of the mobile device.

Referring initially to FIGS. 1-2, a communications system 30 illustratively includes a near field communication (NFC) terminal 31 associated with an object, and a mobile wireless communications device 32 (also referred to as a "mobile device" herein). Example mobile wireless communications devices may include portable or personal media players (e.g., music or MP3 players, video players, etc.), portable gaming devices, portable or mobile telephones, smartphones, tablet computers, digital cameras, etc.

The mobile device 32 illustratively includes a portable housing 33 and a wireless transceiver 34 carried by the portable housing 33. The wireless transceiver 34 may comprise a cellular transceiver or other type of wireless communications transceiver, and may communicate any combination of voice and data, such as, for example, email. The wireless transceiver 34 may communicate with a security server 36, that may provide one or more of remote instructions and provisioning operations of the mobile device 32.

The mobile device 32 includes a display 46 carried by the portable housing 33. The display 46 may comprise a liquid crystal display (LCD) and may be configured to display information relating to data or voice communications. The display 46 may be in the form of an active display that includes a backlight, for example. The display 46 may display email information, contact information, or call information. The display 46 may be another type of display, for example, a passive display, and may display other information.

The mobile device 32 also includes an input device 45. The input device 45 may be a keypad, touch-screen display, or other input device, for example.

The mobile device 32 also includes a processor 35 that is carried by the portable housing 33 and coupled with the wireless transceiver circuitry 34, the input device 45, and the display 46. The processor 35 may be implemented using hardware (e.g., memory, etc.) and software components, i.e., computer-readable instructions for causing the mobile device 32 to perform the various functions or operations described herein.

The mobile device 32 also includes an NFC device 40 carried by the portable housing and coupled with the processor 35. The NFC device 40 includes a NFC controller 41 and a NFC transceiver 42 coupled with the NFC controller 41. The NFC controller 41 and the NFC transceiver 42 advantageously cooperate to perform at least one NFC communication function. For example, the NFC device 40 may communicate with the NFC terminal 31 based upon proximity thereto using NFC communication. The NFC terminal 31 may be a NFC tag, a NFC-enabled mobile device, a smart poster etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The NFC device 40 also includes a first memory 43 coupled to the NFC controller 41. More particularly, the first memory 43 may be embedded within the NFC device hardware or within the NFC integrated circuit (IC). The first memory 43 may be tamper resistant, for example. In other words, the first memory 43 may comprise a secure element. The first memory 43 or secure element, may store applications relating to NFC communications, or contactless applications for communicating with the NFC terminal 31. For example, the applications may include financial payment applications, secure access system applications, loyalty card applications, and other applications, and may be encrypted. In some example embodiments, the first memory 43 may store only one application.

The mobile device 32 also includes a second memory 44. The second memory 44 may be the device memory, for example. In other words, the second memory 44 may include operating system files, applications, and other device data. In some example embodiments, the second memory 44 may be part of the universal integrated circuit card (UICC), for example. The second memory 44 may also be removable, and may be a secure-digital (SD) card or a subscriber identity module (SIM) card, for example. The second memory 44 may be another type of memory, for example a flash memory. Of course, while first and second memories 43, 44 are described herein, more than two memories may be used. In other words, applications, or secure elements, may be stored in or spread over various memory devices. It should also be noted that a secure element may be implemented in a dedicated or secure area of a common memory, for example.

The processor 35 may be configured to disable the NFC transceiver 42 based upon a security condition. A security condition may occur when a user of the device 32 cannot be authenticated, for example, as a result of the user entering too many incorrect passwords via the input device 45. Alternatively, the security condition may occur when the user may have selected, via the input device 45, that a security condition has occurred or wishes to perform operations associated with a security condition, for example, when the user desires to give the device to another user, for example. These operations may be collectively termed a "wipe". Still further, a security condition may occur when the device 32 receives a remote command, i.e. wipe command, indicating a security condition, for example, from a system administrator. Indeed, a wipe may occur at any time, regardless whether the mobile device 32 is coupled to a network.

If a security condition is detected, the processor 35 may be configured to disable access to the applications on the first memory 43, i.e., the NFC based application, for example, the secure payment application. Disabling is performed since the mobile device 32 typically does not have unlimited read/write access to the first memory 43 since the first memory does not inherently "trust" the mobile device 32. Thus, the security server 36 is able to initiate a wipe of the first memory 43 based upon communication therewith, as will be described in further detail below.

After disabling access to the applications on the first memory 43, the processor 35 is configured to erase the contents, or second application from the second memory 44, or device memory. In other words, the mobile device 32 is wiped.

The processor 35 performs a reset operation after successfully erasing the applications from the second memory 44. In other words, the reset operation may be based upon a successful wipe. The reset operation may be performed by selectively disabling a power source 37 carried by the housing 33 and coupled to the processor 35. In other words, the reset operation may be a power down/power up cycle of the mobile device 32. The power source 37 may be a battery cell, for example. In some example embodiments, a reset operation may not be performed.

The processor 35 is also configured to erase the applications from the first memory 43 after the reset operation. The processor 35 may erase the applications based upon a command received from the security server 36 via the wireless transceiver 34 after the reset operation. The processor 35, after the applications are deleted or wiped from the first memory 44, is configured to enable access to the NFC transceiver.

In some example embodiments, the contents, or second application from the second memory 44, may not be erased based upon a security condition. Based upon a security condition, the application on the first memory 43 may be erased while selectively maintaining the second application on the second memory 44. In other words, the processor 35 may be configured to erase the application from the first memory 43 without performing the steps of erasing the second application and resetting.

Figure 3:
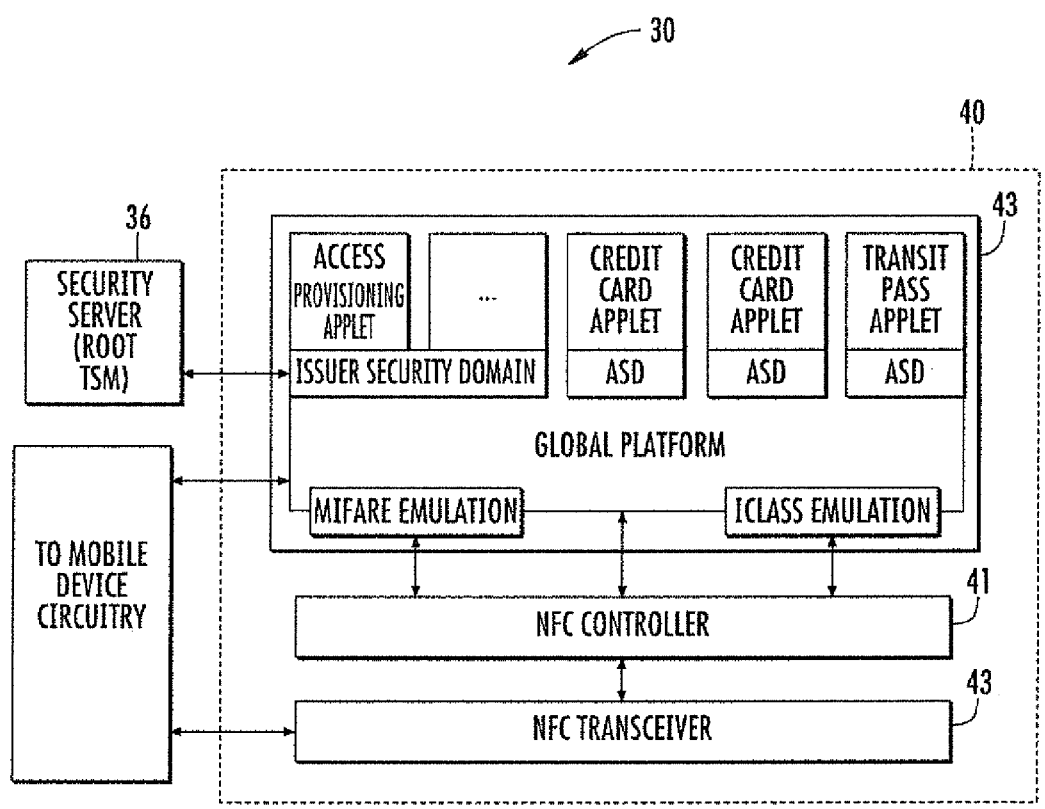
FIG. 3 is a more detailed schematic diagram of the communications system of FIG. 1.

Referring now to FIG. 3, in one advantageous example embodiment, the first memory 43 may be an embedded secure element (eSE). An eSE is an integrated circuit (IC) that manages and includes credentials (e.g., credit cards, access cards, transit passes, etc.) that have been provisioned to the mobile device 32. The eSE 43 runs GlobalPlatform 2.1.1 and is compatible with JavaCard 2.2.2, for example. The eSE 43 may run or be compatible with other or additional platforms.

Within the eSE 43, GlobalPlatform is responsible for managing the lifecycle of other applets, and for providing them with security services (e.g., allowing application security domains to be created). Security domains maintain a lifecycle state for each applet (e.g., active, locked, etc.), manage the keys for authenticated access to an applet, and serve as an endpoint when a secure channel is established between a security server 36, i.e., trusted service manager (TSM) and an applet. The security server 36 or TSM is typically responsible for provisioning and managing the applets within its security domain on the first memory 43.

RF readers, and more particularly, NFC readers (for example, the NFC terminal 31) may communicate with the applets that are installed on the eSE 43 via the NFC controller 41 and NFC transceiver 42. A reader, or NFC terminal 31 first selects an applet by its applet identifier (AID), GlobalPlatform checks for the existence of the applet in question (and verifies that the applet is in the correct lifecycle state), and then further application protocol data units (APDUs) sent by the reader are routed to the applet by GlobalPlatform. Generally, the RF readers, for example, the NFC terminal 31, do not open secure channels to the security domains, and any authentication that occurs with the NFC terminal is the responsibility of the specific applet that gets selected.

The TSM 36 may open a secure channel to the issuer security domain (ISD) via the mobile device 32, by authenticating itself using the appropriate ISD keys. An ISD is considered the security endpoint that communicates with the root TSM and allows for installation of applets and management of application security domains (ASDs). To the mobile device 32, this secure channel is entirely opaque. The TSM 36 may then manage applets (e.g., install and delete them, change their lifecycle states) and manage the application security domains on the eSE 43. After establishing a secure channel with a security domain, the TSM 36 can then send APDUs to the applets that belong to that security domain. The applet can determine that it is communicating with its TSM 36 over a secure channel, and can thus allow access to privileged or "administrative" commands.

The eSE 43 typically does not "trust" the mobile device 32 to the same degree as the TSM 36, since GlobalPlatform may not intend for a mobile device to have access to the keys that are needed to open a secure channel. However, an applet can determine that it is communicating over the baseband interface and thus allow access to commands that would not otherwise be available. The baseband interface generally refers to communications between the processor 35 and the eSE 43, or first memory, (via the NFC controller 41). This may include commands that are sent from the wireless transceiver 34, for example, that are then sent to the eSE 43 across the baseband interface.

For example, a credit card applet may allow the baseband interface to place it in a "visible" or "hidden" state, while allowing access to the necessary commands for a typical financial transaction over the NFC transceiver 42 or RF interface. It should be noted that due to this limitation, the mobile device 32 may not "wipe" the eSE 43 in a conventional sense. Based on the interfaces and application programming interfaces (APIs) provided by GlobalPlatform, there is typically no way for the mobile device 32 to delete an applet or, for that matter, even to enumerate the applets that are installed/instantiated on the eSE 43.

Based on the considerations described earlier, it may be increasingly difficult for the mobile device 32 to directly delete applets from the eSE 43. Conversely, however, it may be unacceptable for a mobile device to delay a wipe until such time that the TSM 36 could be contacted to wipe the eSE 43, especially given that an attacker might remove the mobile device SIM, or any other persistent memory device, i.e., the second memory 44, to ensure it does not have radio coverage.

In the present embodiments, the processor 35 takes steps to ensure data and access to the eSE 43 is locked down when the mobile device wipe is triggered (effectively resembling a wipe of the eSE 43 to the end user) and will result in the eSE being wiped at the next possible opportunity, i.e., whenever the mobile device 32 has data coverage and is able to contact the TSM 36.

The eSE 43 may include applets or other code to perform the wipe process. More particularly, the eSE 43 may include one or more emulation layers, for example, the MIFARE and iClass emulation layers. The emulation layers may not be directly linked to applets or other code on the eSE 43, for example. The applet generally includes security keys for writing to its corresponding emulation layer, for example, for the MIFARE emulation class, this would be K_MIFARE, which is derived from K_A and K_B for a specific block of MIFARE memory. Each of the wipe applets may be installed and instantiated by the TSM 36. The applets may be visible over the baseband interface, and it may respond to a specific APDU that may trigger it to wipe its corresponding emulation layer using the security keys, for example.

The ISD lifecycle state can be moved to card lock, effectively disabling access to all applets on the eSE 43 by an applet provided that it is granted the card lock privilege. Thus, a wipe applet can be installed and instantiated by the TSM 36 to the ISD and given card lock privileges. The applet may be only visible over the baseband interface, and may respond to a specific APDU that triggers it to move the ISD lifecycle state to card lock. Additional code may be used so that certain portions, for example, internal code, can communicate with this applet.

In a normal operating state, the user uses the mobile device 32 normally for voice and/or data communications. For example, if the user uses a wallet application, for example, and the TSM 36 has installed anything to their mobile device's eSE 43, the TSM installs and instantiates the "wipe applet" to the ISD, and asserts the a persistent flag indicating the eSE 43 is in use. If, at some point, the eSE 43 is provisioned with an emulation layer credential, for example, the corresponding emulation layer wipe applet would be installed and instantiated at this time. For example, if the eSE 43 is provisioned with a MIFARE credential, then the MIFARE wipe applet would be installed and instantiated at this time.

In a first step, the wipe is triggered. As noted above, the mobile device wipe may be triggered in multiple ways, for example, too many incorrect passwords guesses via the input device 45 in an attempt to gain access to the mobile device 32, the user may have selected the "wipe" option on the mobile device, or a remote wipe command may be sent. In the remote wipe case, an acknowledgement may be sent, for example. It is worthwhile noting that that the wipe may not be delayed if this acknowledgement is not sent.

In a second step, the access to the processing interface for communicating with the eSE 43 and the transceiver 42 is locked down. If a persistent flag indicating the eSE 43 has been personalized, the mobile device wipe code may assert a persistent flag indicating the eSE 43 has been locked. Each of the above-noted persistent flag may be set or cleared. The eSE primary interface APIs and the NFC transceiver APIs check the value of a persistent flag indicating the eSE 43 has been locked when they are called. If it is asserted, the eSE primary interface APIs typically should ignore any call not coming from an internal or trusted module, and the NFC transceiver APIs should disable all access to the card emulation mode.

In a third step, each emulation layer is wiped. The wipe APDU is sent to the corresponding wipe applet over the baseband interface. The applet wipes personalization data in the emulation layer. More particularly, for example, the wipe APDU may wipe the personalization data in the iClass and MIFARE emulation layers.

In a fourth step, the eSE 43/ISD is moved to a card locked state. The wipe APDU is sent to the wipe applet over the baseband interface. The applet moves the ISD state to card locked, effectively denying access to applets and security domains on the eSE 43. It should be noted that this step must take place after the third step, since otherwise communication may not be possible with the applets that wipe the emulation layers in those steps. After this step, although the eSE 43 still includes personalized applets, these applets are no longer accessible to anyone but the TSM 36. From the end user's perspective, the eSE 43 is "wiped".

In a fifth step, the mobile device 32 is wiped. The mobile device 32 is wiped by operating system (OS) code, for example.

In a sixth step, the mobile device 32 restarts. The mobile device 32 restarts after the wipe is successful.

In a seventh step, an eSE proxy (not shown) signals the TSM 36. The eSE proxy starts up and detects that the ISD is in a card locked state (by attempting to select the ISD over the baseband interface, or by checking the persistent flag indicating the eSE 43 has been locked. It then waits for a data connection and signals the TSM 36 that the eSE 43 needs to be wiped.

In an eight step, the eSE 43 is wiped. The TSM 36 deletes all applets from the eSE 43.

In a ninth step, access to eSE primary interface APIs and the NFC transceiver 42 are restored. Once the TSM 36 is satisfied that all applets have been deleted from the eSE 43, it signals the eSE proxy to de-assert the a persistent flag indicating the eSE 43 has been locked. At this stage, eSE primary interface APIs are unlocked to third parties, and the NFC transceiver 42 is permitted to enter card emulation mode again. The eSE 43, at this point, has been reset to a factory state.

Figure 4:
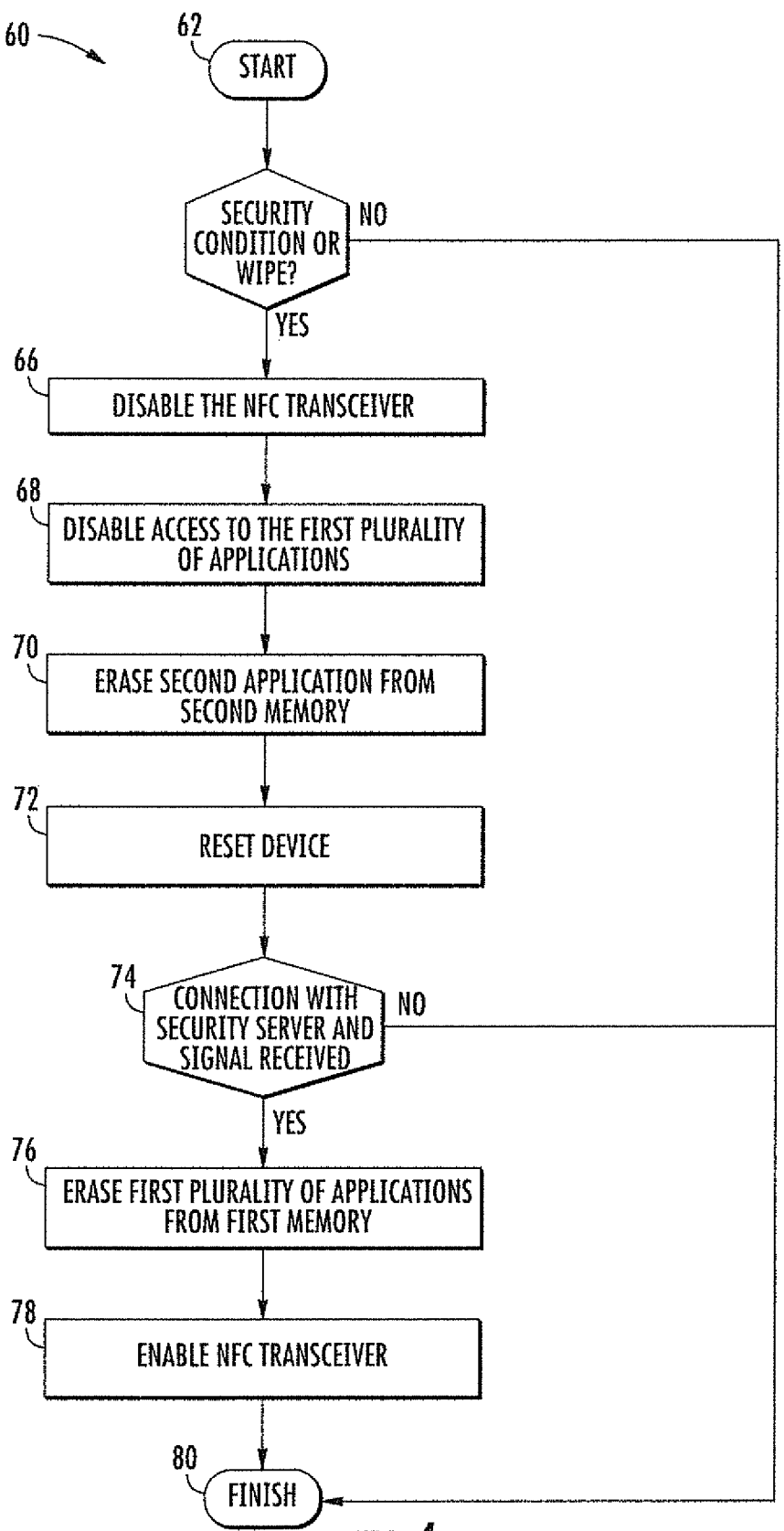
FIG. 4 is a flow diagram illustrating example method aspects associated with the system and devices of FIGS. 1-2.

Referring now to the flowchart 60 of FIG. 4, related method aspects are now described. Beginning at Block 62, the processor 35 determines whether a security condition, or wipe, has been initiated (Block 64). If a security condition or wipe is determined, the processor 35 disables the NFC transceiver 42 (Block 66). The processor 35 then disables access to the first plurality of applications on the first memory 43 (Block 68). At Block 70, the processor 35 erases the second application from the second memory 44. A reset operation is performed by the processor 35 (Block 72). At Block 74, the security server 36 sends a signal to the processor 35 via the wireless transceiver 34 once a connection is established therewith. At Block 76 the processor 35 erases the first plurality of applications from the first memory 43 if the signal from the security server 36 is received. The NFC transceiver 42 at Block 78 is re-enabled after the first plurality of applications is erased. The method ends at Block 80.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
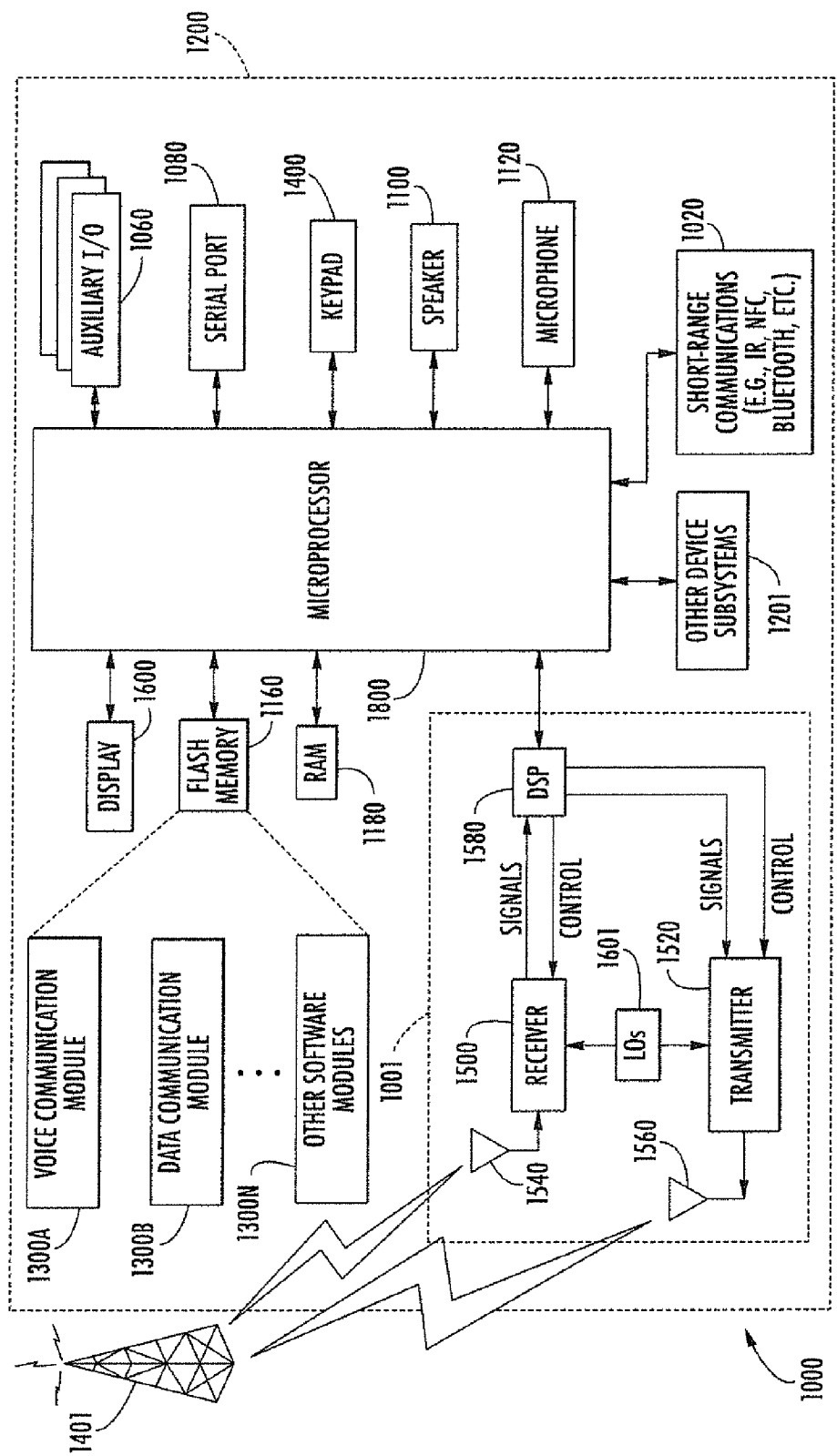
FIG. 5 is a schematic block diagram illustrating example mobile wireless communications device components that may be used with the devices of FIGS. 1-3.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a wireless transceiver;
a processor coupled with said wireless transceiver;
a near-field communication (NFC) device coupled with said processor, said NFC device comprising
an NFC controller,
an NFC transceiver coupled with said NFC controller, and
a first memory coupled with said NFC controller, the first memory configured to store at least one first application; and
a second memory coupled to said processor and configured to store at least one second application;
said processor being configured to disable said NFC transceiver based upon a security condition, disable access to the at least one first application, erase the at least one second application, perform a reset operation, and erase the at least one first application after the reset operation.

2. The mobile wireless communications device of claim 1 wherein said processor being configured to perform the reset operation comprises said processor being configured to perform the reset operation after the erase of the at least one second application of said second memory.

3. The mobile wireless communications device of claim 1 wherein said first memory comprises a secure element.

4. The mobile wireless communications device of claim 1 wherein said processor is further configured to enable access to said NFC transceiver after the at least one first application is erased from said first memory.

5. The mobile wireless communications device of claim 1 wherein said processor is further configured to erase the at least one first application after the reset operation is performed, based upon communication via said wireless transceiver.

6. The mobile wireless communications device of claim 1 further comprising an input device coupled to said processor; and wherein the security condition comprises a threshold number of unsuccessful access attempts via said input device.

7. The mobile wireless communications device of claim 1 further comprising an input device coupled to said processor; and wherein the security condition comprises a security command entered via said input device.

8. The mobile wireless communications device of claim 1 wherein the security condition comprises a security command received via said wireless transceiver.

9. The mobile wireless communications device of claim 1 further comprising a power source coupled to said processor;

and wherein said processor is configured to perform the reset operation by at least selectively disabling the power source.

10. A communications system comprising:
a near field communications (NFC) terminal; and
a mobile wireless communications device configured to communicate with said NFC terminal and comprising
a wireless transceiver,
a processor coupled with said wireless transceiver,
a near-field communication (NFC) device coupled to said processor, said NFC device comprising
an NFC controller,
an NFC transceiver coupled to said NFC controller, and
a first memory coupled with said NFC controller, the first memory configured to store a first plurality of applications for communicating with said NFC terminal; and
a second memory coupled to said processor and configured to store at least one second application;
said processor being configured to disable said NFC transceiver based upon a security condition, disable access to the first plurality of applications, erase the at least one second application, perform a reset operation, and erase the first plurality of applications from said first memory after the reset.

11. The communications system of claim 10 wherein said first memory comprises a secure element.

12. The communications system of claim 10 wherein said processor is further configured to enable access to said NFC transceiver after the first plurality of applications is erased from said first memory.

13. The communications system of claim 10 further comprising a security server configured to communicate with said mobile wireless communications device via said wireless transceiver, and configured to instruct said processor to erase the first plurality of applications based upon communication therewith.

14. A communications method for a mobile wireless communications device comprising a wireless transceiver, a processor coupled with the wireless transceiver, a near-field communication (NFC) device coupled with the processor and comprising an NFC controller, an NFC transceiver coupled with the NFC controller, and a first memory coupled with the NFC controller and configured to store a first plurality of applications, the mobile wireless communications device also comprising a second memory configured to store a second application, the method comprising:
using the processor to disable the NFC transceiver based upon a security condition;
using the processor to disable access to the first plurality of applications;
using the processor to erase the second application;
using the processor to perform a reset operation; and
using the processor to erase the first plurality of applications from the first memory after the reset operation.

15. The method of claim 14 wherein using the processor to perform a reset operation comprises using the processor to perform the reset operation after the erase of the second application.

16. The method of claim 14 wherein the first memory comprises a secure element.

17. The method of claim 14 further comprising using the processor to enable access to the NFC transceiver after the first plurality of applications is erased.

18. The method of claim 14 wherein using the processor to erase the first plurality of applications comprises using the processor to erase the first plurality of applications after the reset operation is performed, based upon communication via the wireless transceiver.

19. The method of claim 14 further comprising using the processor to perform the reset operation by at least selectively disabling a power source coupled thereto.

20. A non-transitory computer-readable medium for use with a mobile wireless communications device comprising a wireless transceiver, a processor coupled with the wireless transceiver circuitry, a near-field communication (NFC) device coupled with the processor and comprising an NFC controller, an NFC transceiver coupled with the NFC controller, and a first memory coupled with the NFC controller and configured to store a first plurality of applications, the mobile wireless communications device also comprising a second memory configured to store a second application, the non-transitory computer-readable medium having computer-executable instructions for causing the mobile wireless communications device to perform steps comprising:
disabling the NFC transceiver based upon a security condition;
disabling access to the first plurality of applications;
erasing the second application;
performing a reset operation; and
erasing the first plurality of applications from the first memory after the reset operation.

21. The non-transitory computer-readable medium of claim 20 wherein the computer-executable instructions are for causing the mobile wireless communications device to perform the reset operation after the erase of the second application.

22. The non-transitory computer-readable medium of claim 20 wherein the first memory comprises a secure element.

23. The non-transitory computer-readable medium of claim 20 wherein the computer-executable instructions are for causing the mobile wireless communications device to further perform the step of enabling access to the NFC transceiver after the first plurality of applications are erased.

24. The non-transitory computer-readable medium of claim 20 wherein the computer-executable instructions are for causing the mobile wireless communications device to further perform the step of erasing the first plurality of applications after the reset operation is performed, based upon communication via the wireless transceiver.

25. The non-transitory computer-readable medium of claim 20 wherein the computer-executable instructions are for causing the mobile wireless communications device to perform the reset operation by at least selectively disabling a power source coupled thereto.

* * * * *